United States Patent [19]
Unate

[11] Patent Number: 5,335,922
[45] Date of Patent: Aug. 9, 1994

[54] CHUCK

[76] Inventor: Miyuki Unate, 9-15, Kosaku 4-chome, Funabashi-shi, Chiba-ken, Japan

[21] Appl. No.: 65,253

[22] Filed: May 21, 1993

[30] Foreign Application Priority Data

May 25, 1992 [JP] Japan .................................. 4-34714
Sep. 14, 1992 [JP] Japan ................................. 4-244917

[51] Int. Cl.⁵ .............................................. B23B 31/04
[52] U.S. Cl. ..................................... 279/9.1; 279/903; 409/234
[58] Field of Search ................. 279/9.1, 903, 102, 103; 409/232, 234

[56] References Cited
U.S. PATENT DOCUMENTS 4,021,051  5/1977  Toyomoto et al. ................. 279/9.1

Primary Examiner—Steven C. Bishop
Attorney, Agent, or Firm—Nikaido Marmelstein Murray & Oram

[57] ABSTRACT

A chuck for fixing a rotary tool such a drill and an end mill to a machine tool is disclosed. This chuck comprises a main body comprising a taper shank for fixing the chuck to the machine tool and a tool support for clamping the rotary tool, a fastening ring for regulating fastening force by the tool support, a needle roller bearing interposed between the fastening ring and the tool support under an inclined state, and a gear mechanism for rotating the fastening ring. This gear mechanism comprises, for example, a worm wheel formed integrally with the fastening ring and a worm engaging with the worm wheel. When this structure is employed, the rotary tool can be fitted to and removed from the chuck without fixing a spindle of the machine tool, and the fastening ring can be turned without a great force.

8 Claims, 7 Drawing Sheets

CHUCK

BACKGROUND OF THE INVENTION

This invention relates to a chuck for fixing a rotary tool such as a drill and an end mill to a machine tool.

An ordinary chuck is equipped with a taper shank for fitting the chuck to a spindle of a machine tool at one of the ends thereof in its axial direction and a tool support for fitting a rotary tool at the other end. In addition, the chuck includes a fastening ring for regulating fastening force by the tool support and fitted over the tool support.

When the rotary tool is fitted to, or removed from, the chuck while the conventional chuck is in use, braking force is first applied to a driving device such as a gear mechanism and a motor for driving a spindle of the machine tool so as to fix the spindle. The fastening ring of the chuck is then rotated by a tool such as a spanner under this state to regulate the fastening force of the tool support, and the rotary tool is changed thereafter.

To tightly fasten the rotary tool to the chuck, the fastening ring must be fastened beforehand by a considerably great force. This fastening ring receives rotating torque of the motor during machining and is fastened further tightly.

To fit and remove the rotary tool to and from the chuck, therefore, a brake device is necessary for fixing the spindle of the machine tool, and moreover, the operation of this brake device and turning of the fastening ring are necessary.

Since a great force is required for turning this fastening ring, it is not so easy to fit the rotary tool to the chuck, and it is more difficult to remove the rotary tool from the chuck.

SUMMARY OF THE INVENTION

The present invention aims at providing a chuck which can fit and remove a rotary tool to and from the chuck without fixing the spindle of a machine tool, and moreover, can turn a fastening ring without requiring a great force.

To accomplish this object, the chuck according to the present invention comprises a main body comprising a taper shank for fixing the chuck to a machine tool and a tool support for clamping a rotary tool, a fastening ring for regulating fastening force by the tool support, a needle roller bearing interposed between the fastening ring and the tool support under an inclined state and a gear mechanism for rotating the fastening ring. This gear mechanism preferably comprises a worm wheel formed integrally with the fastening ring and a worm engaging with the worm wheel.

Since the chuck according to the present invention is equipped with the gear mechanism, the fastening ring can be turned by operating this gear mechanism. If the gear mechanism is constituted by the worm wheel and the worm as described above, for example, the worm wheel having an axis aligned with the axis of the spindle of the machine tool can be rotated by rotating the worm having an axis crossing orthogonally the axis of the spindle of the machine tool. In other words, the fastening ring can be rotated by merely rotating the worm in a rotating direction different from the rotating direction of the spindle of the machine tool, so that the spindle need not be fixed.

Since the chuck according to the present invention is equipped with the gear mechanism described above, the fastening ring can be rotated by a small force. This can be accomplished by the construction in which the rotating speed of the worm is reduced and is transmitted to the worm wheel.

DETAILED DESCRIPTION OF THE PREFERRED EMBODIMENTS

Figure 1:
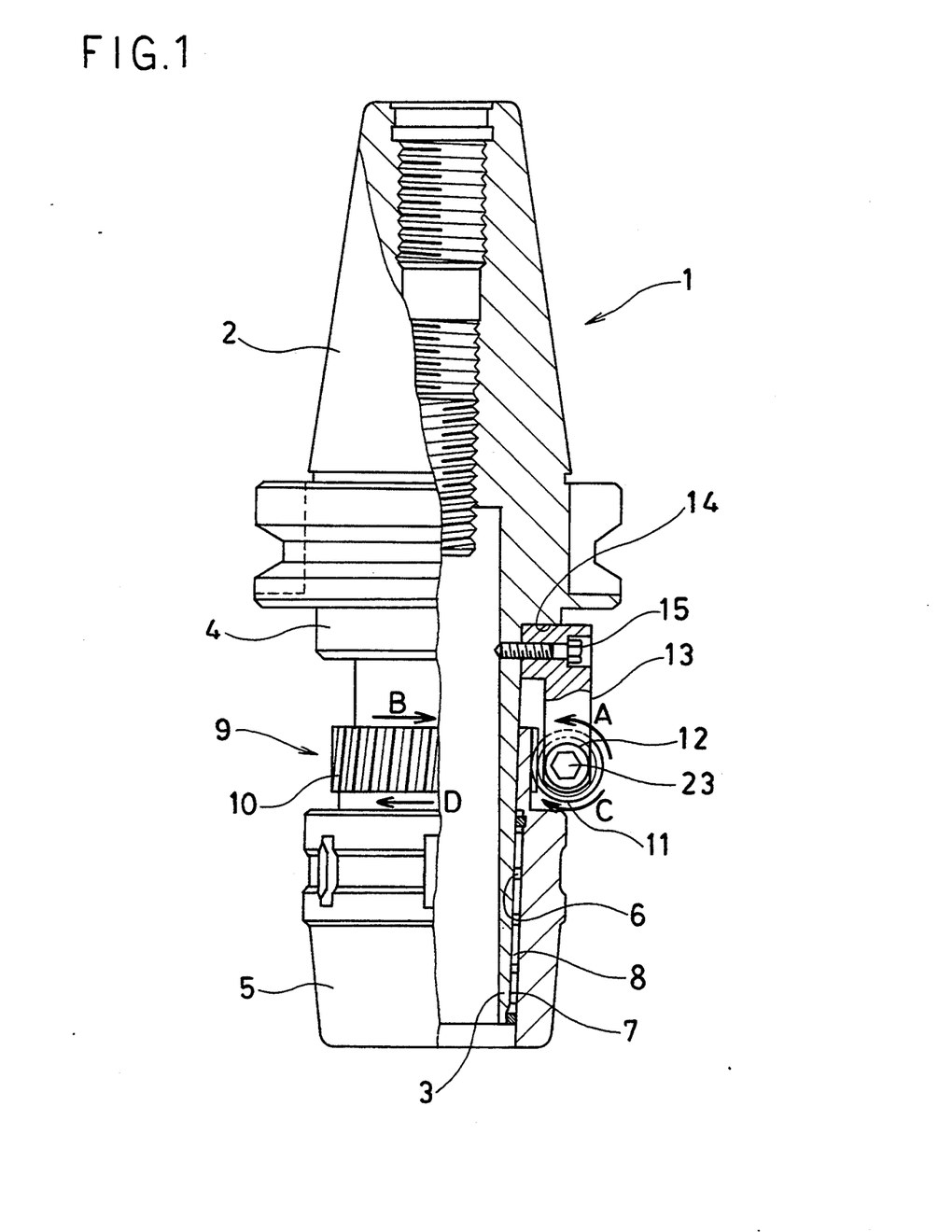
FIG. 1 is a partially sectional front view of a chuck according to the first embodiment of the present invention.
Figure 2:
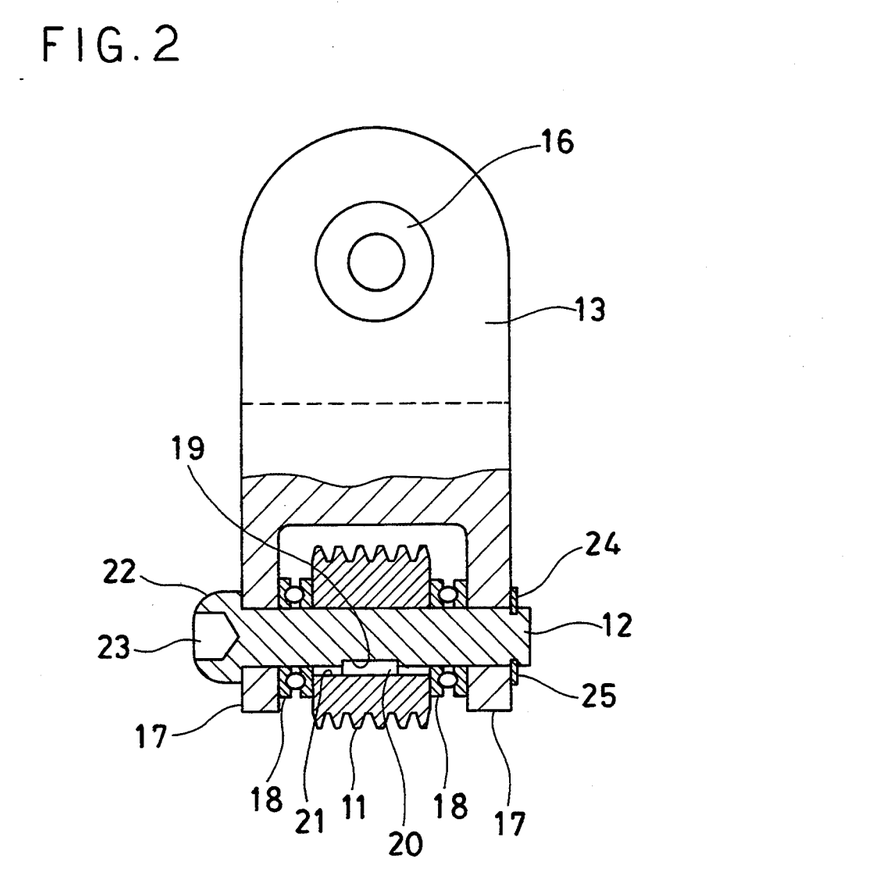
FIG. 2 is a partially sectional side view of a worm used for the chuck shown in FIG. 1 and a worm holder for supporting this worm.

First of all, the structure of the chuck according to the first embodiment of the present invention will be explained. FIG. 1 shows the chuck 1 according to the first embodiment as a whole, and FIG. 2 shows a part of this chuck.

A taper shank 2 for fixing the chuck 1 to a machine tool is formed at an upper portion of the chuck 1 and a tool support 3 for holding a rotary tool is formed at a lower portion of the chuck 1. The taper shank 2 and the tool support 3 together constitute the main body 4 of the chuck 1.

A fastening ring 5 is disposed round the outer periphery of the tool support 3. A needle roller bearing 8 is interposed in an oblique direction between a taper surface 6 of this fastening ring 5 and a taper surface 7 of the tool support 3 in such a manner as to spirally roll with respect to the axis of the chuck 1. Needle rollers of this needle roller bearing 8 are disposed at predetermined positions by a retainer, not shown in the drawing.

When the fastening ring 5 is rotated in a circumferential direction, the fastening ring 5 is moved up and down by the needle roller bearing 8 in such a manner as to describe a spiral. When the fastening ring 5 moves up, fastening force by the tool support 3 increases, and when the fastening ring moves down, this force decreases.

The chuck 1 is provided with a gear mechanism 9 for rotating the fastening ring 5. The gear mechanism 9 comprises a worm wheel 10 integrally formed with the main body 4 of the chuck 1 and a worm 11 engaging with this worm wheel 10.

The worm 11 is so supported by a worm holder 13 as to be capable of rotating on a shaft 12, and the worm holder 13 is fixed by a bolt 15 under the state where it is pushed into a groove 14 formed in the main body 4 of the chuck 1. The head of the bolt 15 is accommodated in a cap hole 16 of the worm holder 13.

Two arms 17 are formed at a lower portion of the worm holder 13, and thrust bearings 18 are sandwiched between these arms 17 and the worm 11, respectively.

A key groove 19 is formed in the outer periphery of the shaft 12, and a key 20 fitted into this key groove 19 is fitted into a key groove 21 which is in turn formed in the inner periphery of the worm 11. The key 20 permits the shaft 12 and the worm 11 to integrally rotate with each other.

A hexagonal groove 23, into which a hexagonal wrench fits, is formed at a head 22 as one of the ends of the shaft 12 and a snap ring 25 for preventing fall-off of the shaft 12 from the arms 17 of the worm holder 13 is fitted into a ring-like groove 24 of the shaft, at the other end of the shaft.

Next, the method of using the chuck 1 according to the first embodiment of the present invention will be explained. When a rotary tool fixed to the chuck 1 is to be removed, the hexagonal wrench is fitted into the hexagonal groove 23 of the shaft 12 and the shaft 12 is then rotated in a direction indicated by an arrow A. Then, the worm 11 rotates with the shaft 12, and the worm wheel 10 meshing with this worm 11 rotates in a direction indicated by an arrow B, thereby rotating the fastening ring 5 in the same direction as the worm wheel 10. As a result, the fastening ring 5 moves down and the fastening force of the tool support 3 decreases. When this fastening force becomes small, the rotary tool is pulled out from the tool support 3.

On the contrary, the rotary tool can be fitted to the chuck 1 in the follow way. The rotary tool is first fitted into the tool support 3, the hexagonal wrench is then fitted into the hexagonal groove 23 of the shaft 12, and thereafter the shaft 12 is rotated in a direction indicated by an arrow C.

Then, the worm 11 rotates with the shaft 12, the worm wheel 10 rotates in a direction indicated by an arrow D, and the fastening ring 5, too, rotates in the direction of the arrow D. The fastening ring 5 moves up with its rotation and the fastening force of the tool support 3 increases. In this way, fitting of the rotary tool can be completed.

The chuck 1 according to this embodiment is provided with the gear mechanism 9 comprising the worm wheel 10 and the worm 11. Accordingly, the worm wheel 10 which is coaxial with the spindle of the machine tool can be rotated by rotating the worm 11. In other words, it is no longer necessary to fix the spindle of the machine tool so as to rotate the fastening ring 5.

When the worm 11 is rotated by the use of the hexagonal wrench, the rotating speed of this worm 11 is reduced and is transmitted to the worm wheel 10. For this reason, even when the worm 11 is rotated with a small torque, the fastening ring 5 which is tightly fastened can be rotated easily.

In this embodiment, the worm holder 13 is fitted to the main body 4 of the chuck 1 in order to support the worm 11. Where balance of rotation of the chuck 1 is disturbed by the mass of this worm holder 13, however, a balance weight is preferably added.

In the chuck 1 according to this embodiment, the taper shank 2 and the tool support 3 are integrally constituted, but the present invention can likewise be applied to a chuck of the type where the taper shank 2 and the tool support 3 are separate from each other.

Figure 3:
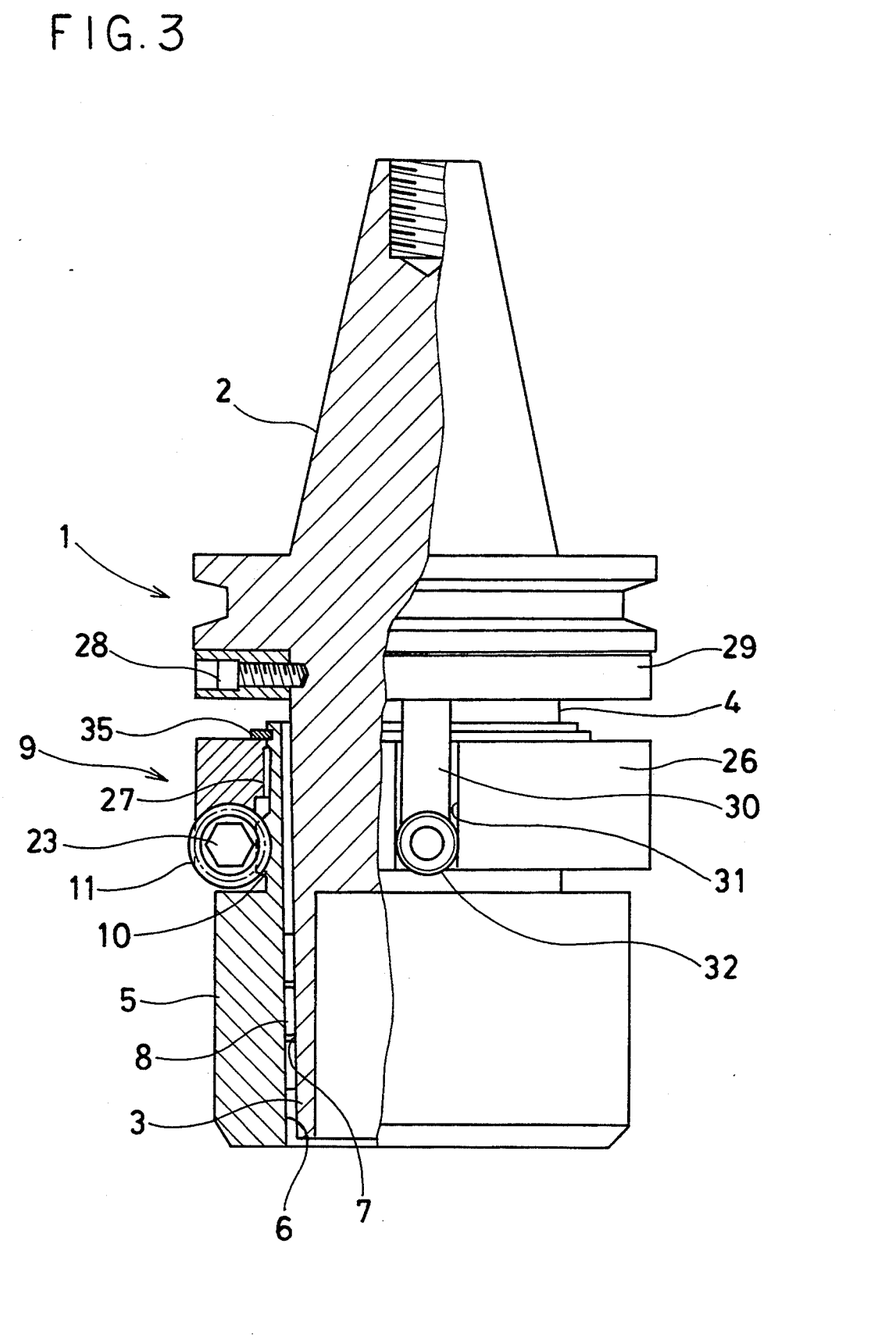
FIG. 3 is a partially sectional front view of a chuck according to the second embodiment of the present invention.

Next, the structure of the chuck according to the second embodiment of the present invention will be explained. FIG. 3 shows the chuck 1 according to the second embodiment as a whole, and each of FIGS. 4 to 9 shows a part of the chuck. By the way, like reference numerals will be used to identify like constituent elements as in the first embodiment, and the explanation of such constituent elements will be omitted.

The gear mechanism 9 in this embodiment comprises the combination of the worm wheel 10 and the worm 11 in the same way as in the first embodiment. In this embodiment, the worm 11 is supported by the worm holder ring 26, and this worm holder ring 26 is supported by the fastening ring 5 through the needle roller bearing 27.

The stopper 29 is fixed to the main body 4 of the chuck 1 by the bolt 28, and a bearing 32 capable of sliding inside a groove 31 formed in the worm holder ring 26 is formed at the lower end of the arm 30 of the stopper 29.

Figure 4:
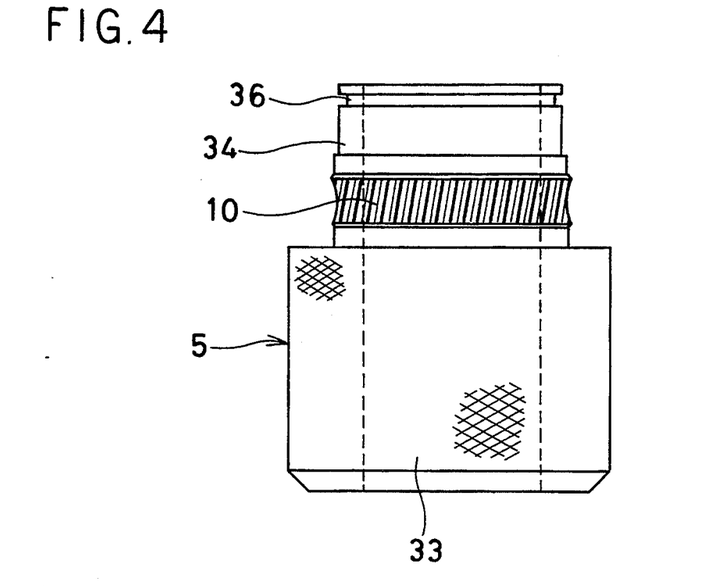
FIG. 4 is a front view of a fastening ring used for the chuck shown in FIG. 3.

Knurling is applied to the outer surface of the knob 33 of the fastening ring 5 as shown in FIG. 4, and the worm wheel 10, an inner lace 34 of the needle roller bearing 27 and a ring-like groove 36 into which the snap ring 35 fits are defined above this knob 33. The snap ring 35 is disposed in order to prevent any shake of the worm holder ring 26 in the vertical direction.

Figure 5:
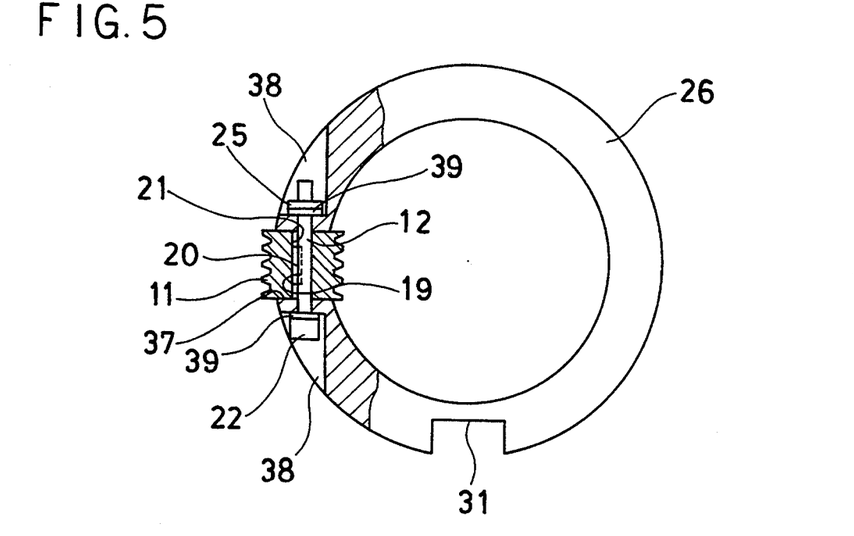
FIG. 5 is a partially sectional plan view of a worm holder ring used for the chuck shown in FIG. 3.
Figure 6:
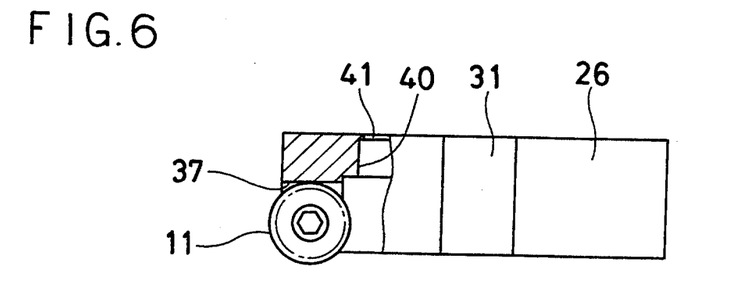
FIG. 6 is a partially sectional front view of a worm holder ring used for the chuck shown in FIG. 3.
Figure 7:
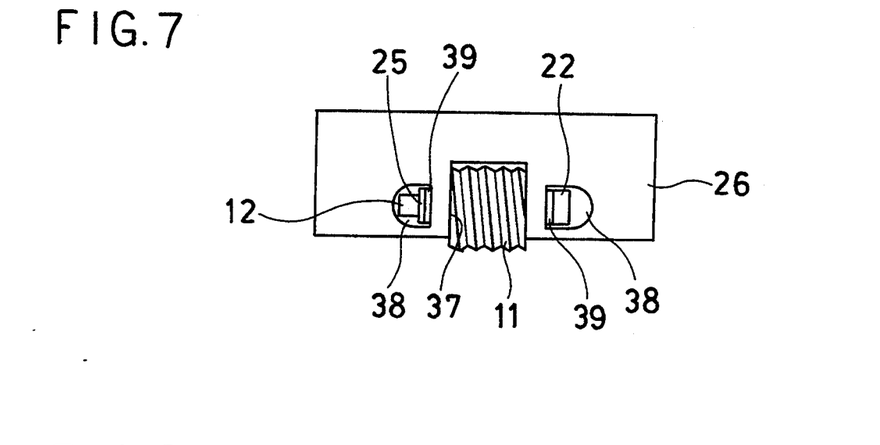
FIG. 7 is a side view of a worm holder ring used for the chuck shown in FIG. 3.

As shown in FIGS. 5, 6 and 7, a groove 31 in which the bearing 32 slides and a notch 37 for accommodating the worm 11 are defined in the worm holder ring 26, and a pair of recesses 38 are formed further to accommodate the shaft 12 which supports the worm 11.

The hexagonal groove 23 is formed at the head 22 as one of the ends of the shaft 12 in the same way as in the first embodiment, and a ring 39 made of a synthetic resin and the snap ring 25 are fitted to the other end of the shaft 12. The synthetic resin ring 39 is a bearing member which exhibits the same function as the thrust bearing 18.

A retainer 41 of the needle roller bearing 27 is formed above the outer lace 40 of the needle roller bearing 27.

Figure 8:
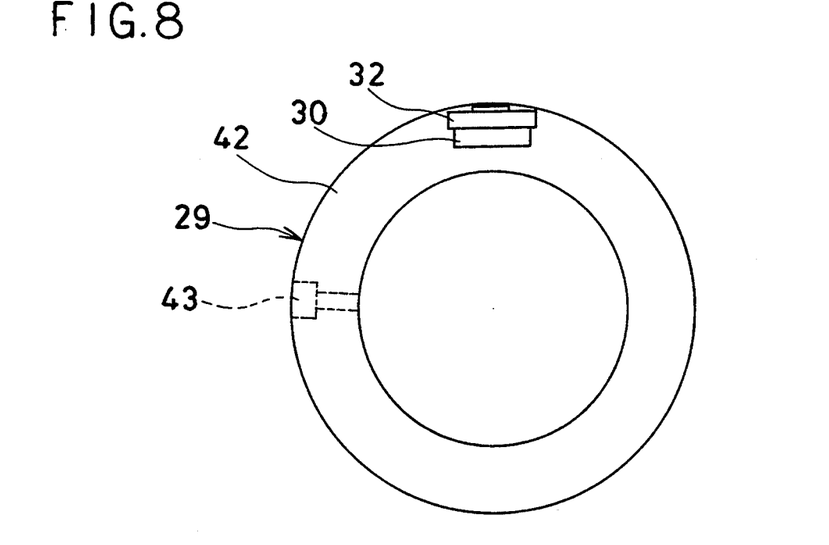
FIG. 8 is a bottom view of a stopper used for the chuck shown in FIG. 3.
Figure 9:
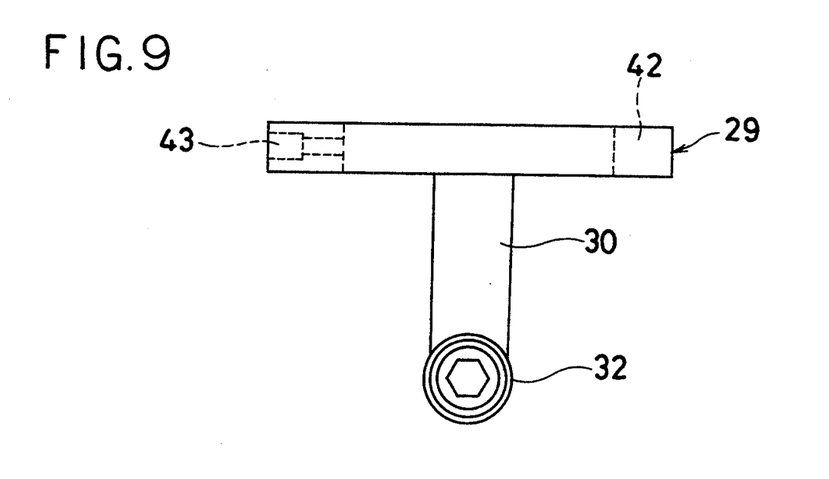
FIG. 9 is a front view of a stopper used for the chuck shown in FIG. 3.

As shown in FIGS. 8 and 9, the stopper 29 comprises a ring 42 and an arm 30, and the bearing 32 is fitted to the distal end of the arm 30. A bolt hole 43 is defined in the ring 42, and the bolt 28 meshing with this bolt hole 43 fixes the stopper 29 to the main body 4 of the chuck 1.

The method of using the chuck 1 in this embodiment is the same as that of the chuck 1 of the first embodiment. In this embodiment, the needle roller bearing 27 is sandwiched between the fastening ring 5 and the worm holder ring 26. Therefore, when the shaft 12 is turned by the hexagonal wrench, the reaction of the turning force for the fastening ring 5 is to rotate the worm holder ring 26. The stopper 29 is disposed in order to prevent this movement of the worm holder ring 26 in the circumferential direction.

The bearing 32 is disposed at the distal end of the arm 30 of the stopper 29. Therefore, the worm holder ring 26 can move up and down smoothly with the movement of the fastening ring 5 in the vertical direction while being guided by the bearing 32.

When the chuck 1 of the second embodiment is used, it is no longer necessary to fix the spindle of the machine tool to rotate the fastening ring 5, in the same way as in the first embodiment. Furthermore, the fastening ring 5 which is tightly fixed can be turned easily with a small torque.

The balance of masses can be established by using the worm holder ring 26 in combination with the stopper 29. Accordingly, any disturbance of the balance of rotation of the chuck 1 can be prevented without fitting a balance weight. Furthermore, the positional relationship between the worm 11 and the worm wheel 10 does not always change, and consequently, a worm wheel 10 having a small width can be used. In addition, the worm holder ring 26 plays the role of a cover for protecting the worm wheel 10.

Figure 10:
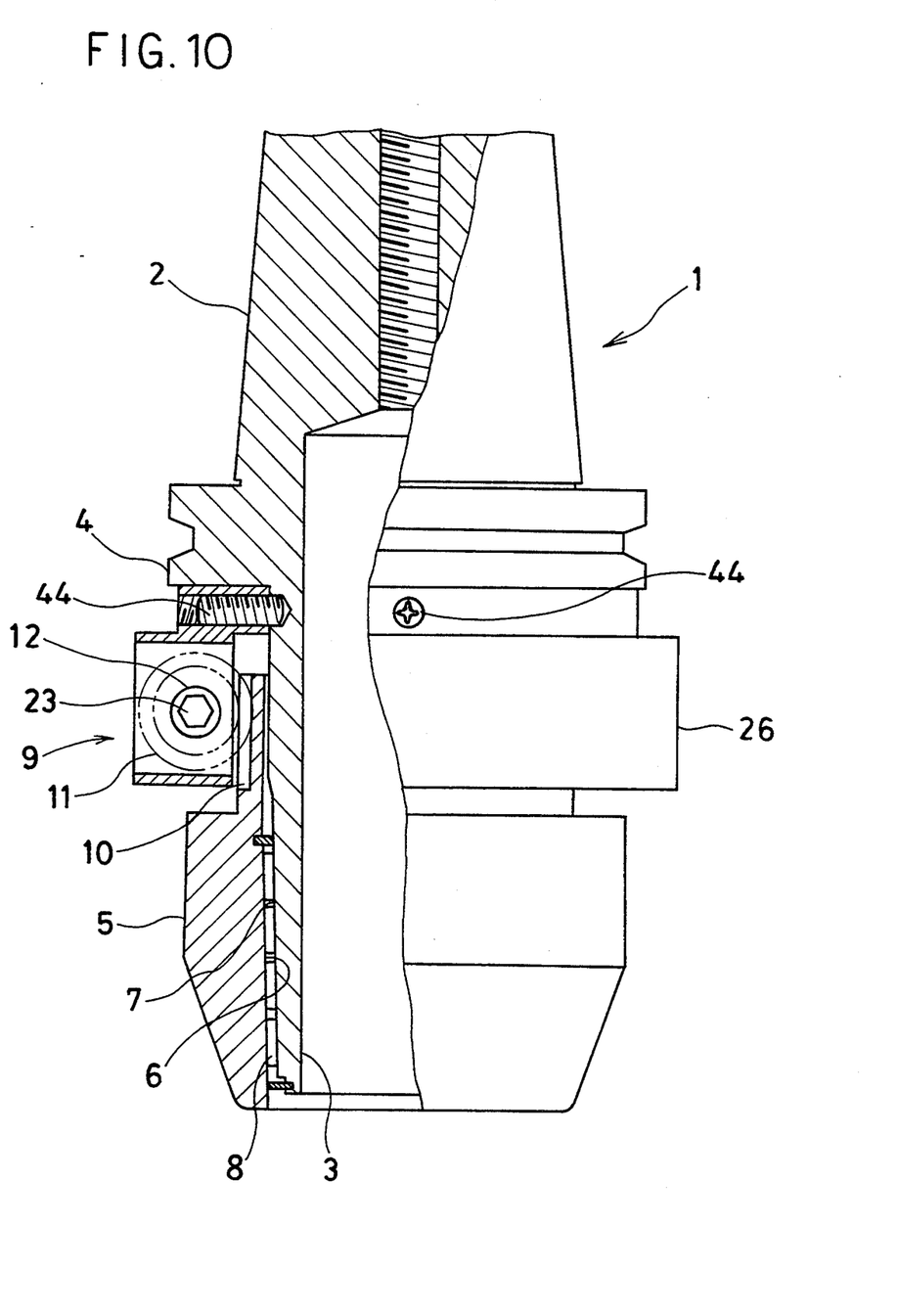
FIG. 10 is a partially sectional front view of a chuck according to the third embodiment of the present invention.
Figure 11:
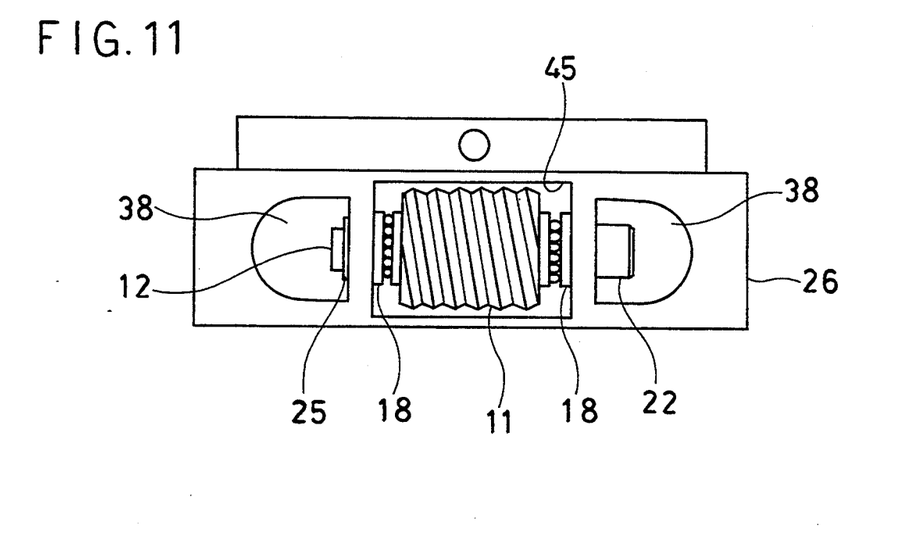
FIG. 11 is a side view of a worm holder ring used for the chuck shown in FIG. 10.
Figure 12:
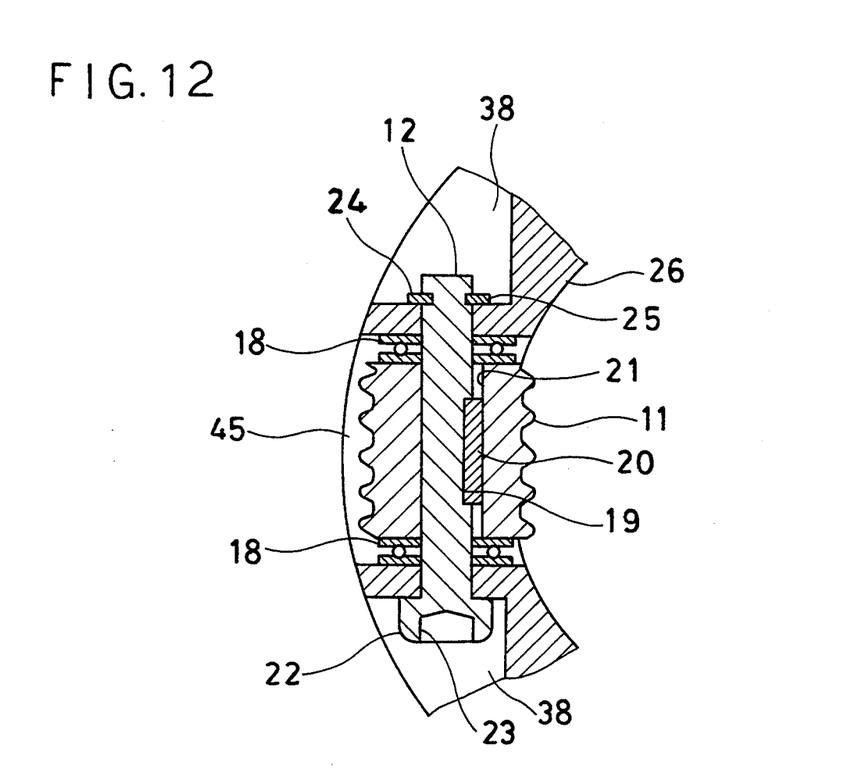
FIG. 12 is a sectional plan view of a part of the worm holder ring used for the chuck shown in FIG. 10.

Next, the structure of the chuck according to the third embodiment will be explained. FIG. 10 shows the chuck 1 according to the third embodiment of the present invention as a whole, and FIGS. 11 and 12 shows a part of this chuck. By the way, like reference numerals will be used to identify like constituent elements as in the first and second embodiments, and the explanation of such elements will be omitted.

The gear mechanism 9 in this embodiment comprises the combination of the worm wheel 10 and the worm 11 in the same way as in the first and second embodiments. In this embodiment, the worm 11 is supported by the worm holder ring 26, and this worm holder ring 26 is fixed to the main body 4 of the chuck 1 by a plurality of stud bolts 44.

A window 45 for accommodating the worm 11 and a pair of thrust bearings 18 and a pair of recesses 38 for accommodating the shaft 12 which supports the worm 11 are defined in the worm holder ring 26.

The hexagonal groove 23 is formed at the head 22 as one of the ends of the shaft 12, and the ring-like groove 24 to which the snap ring 25 fits is formed at the other end of the shaft 12. The key groove 19 is formed in the outer periphery of the shaft 12, and the key 20 which is fitted into this key groove 19 is in turn fitted into the key groove 21 formed in the inner periphery of the worm 11.

The chuck 1 in this third embodiment, too, can give the same effect as those of the first and second embodiments.

What is claimed is:

1. A chuck comprising:
   a main body comprising a taper shank for fixing said chuck to a machine tool and a tool support for clamping a rotary tool;
   a fastening ring for regulating fastening force by said tool support;
   a needle roller bearing interposed between said fastening ring and said tool support under an inclined state; and
   a gear mechanism for rotating said fastening ring, wherein said gear mechanism comprises a worm wheel integrally formed with said fastening ring and a worm meshing with said worm wheel.

2. A chuck according to claim 1, wherein said worm is supported by a worm holder fixed to said main body.

3. A chuck according to claim 2, which further includes a balance weight for compensating for disturbance of a balance of rotation of said chuck resulting from the provision of said gear mechanism.

4. A chuck according to claim 1, wherein said worm is supported by a worm holder ring supported by said fastening ring through a bearing, and said worm holder ring is prevented from rotating in a circumferential direction by a stopper fixed to said main body.

5. A chuck according to claim 4, wherein said stopper includes a bearing for guiding said worm holder ring in an axial direction thereof.

6. A chuck according to claim 1, wherein said worm is supported by a worm holder ring fixed to said main body.

7. A chuck according to any one of claims 1, 2, 3, 4, 5 or 6, wherein said worm is provided with an engagement portion for engaging with a tool for rotating said worm.

8. A chuck according to any one of claims 1, 2, 3, 4, 5 or 6, wherein said taper shank and said tool support are formed integrally with each other.

* * * * *